Patented July 8, 1941

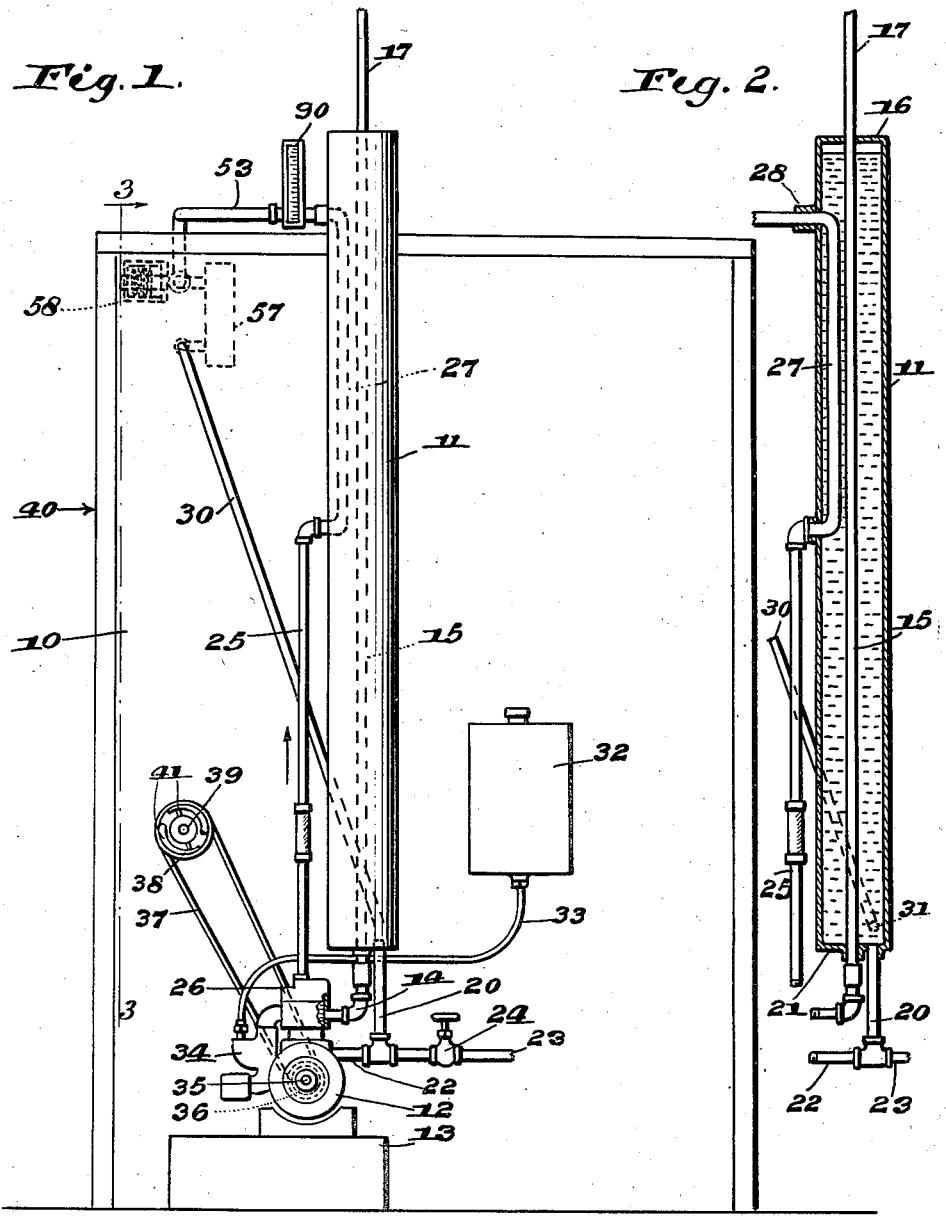
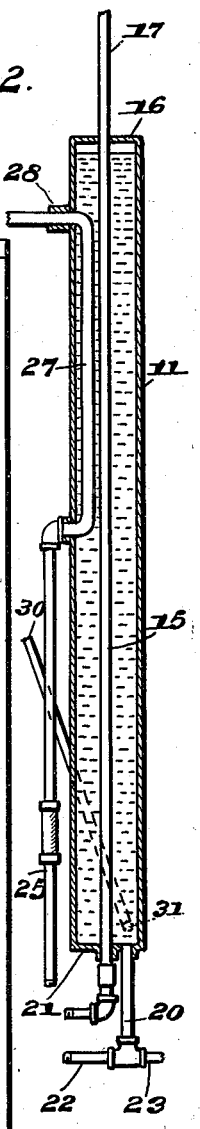

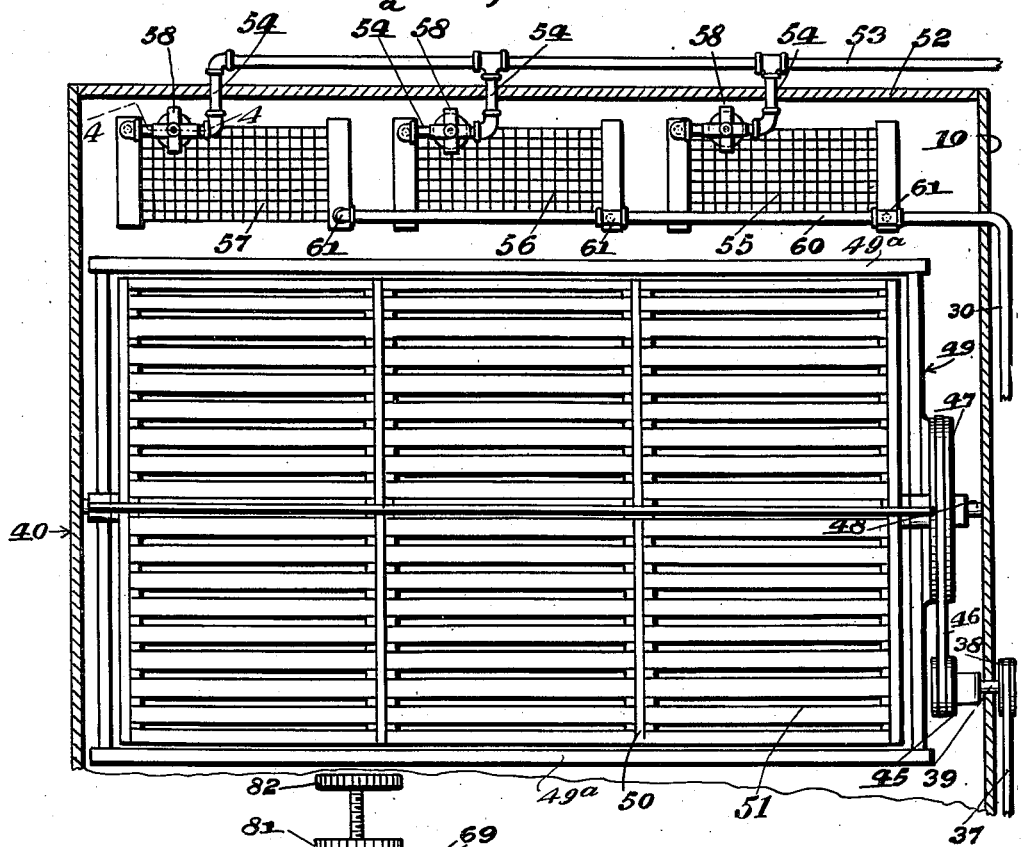
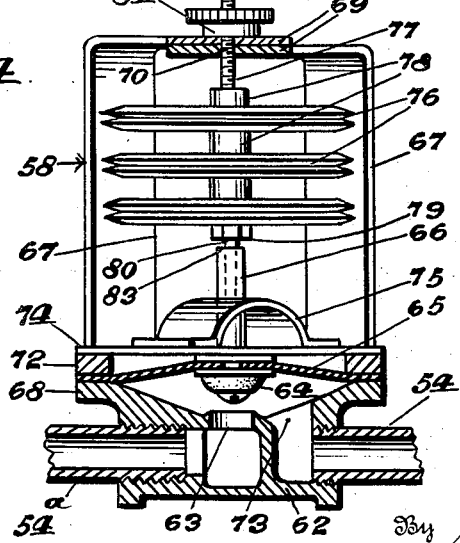
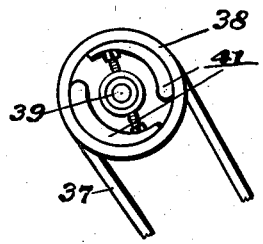

2,248,896

UNITED STATES PATENT OFFICE 2,248,896

INCUBATOR

Ray M. Petersime, Gettysburg, Ohio

Application October 20, 1939, Serial No. 300,473

2 Claims. (Cl. 237—12.1)

This invention relates to a hot water heating system for incubators.

An object of the invention is the provision of an incubator in which an internal combustion engine is employed for operating the fan for creating a circulation of air in the incubator and also for supply thermostatically controlled radiators with hot water directly from the cooling system of the engine, the exhaust gases cooperating with the cooling system for heating the water before said water is conducted to the radiators.

Another object of the invention is the provision of an incubator in which air is maintained in circulation in the incubator by devices operated by an internal combustion engine which also supplies the heating fluid for maintaining a predetermined temperature in the incubator, the temperature in the various compartments in the incubator being controlled in accordance with the requirement in each compartment.

A further object of the invention is the provision of an incubator in which the motivating element for the air circulation within the incubators is employed for supplying radiators which are individually controlled with a heating fluid for maintaining a predetermined temperature, the heating fluid conducted through the radiators being utilized for cooling the motivating element while the waste products of combustion from the motivating element are used for raising the temperature of the heating fluid.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a side view of an incubator showing a mechanism for operating an air circulating means and also for heating and raising the temperature of a heating fluid supplied to radiators in the incubator.

Figure 2 is a vertical section of a tank for storing and partially heating the fluid which is maintained in circulation in the radiators of the incubator.

Figure 3 is a vertical section of the incubator showing the interior thereof and taken along the line 3—3 of Fig. 1.

Figure 4 is an enlarged vertical section along the line 4—4 of Fig. 3 of the thermostat controlling the flow of the heating fluid in the radiators of the incubator.

Figure 5 is an enlarged fragmentary side view of a clutch mechanism associated with a pulley.

Referring more particularly to the drawings, 10 designates a side wall of an incubator constructed in accordance with the principles of my invention. Adjacent this side wall is a vertically disposed tank 11 which is supported in any approved manner by the side wall of the incubator. This tank is adapted to be covered with an insulating material to prevent the loss of heat therefrom as is well known in the art.

An internal combustion engine 12 of any suitable type is mounted upon a base 13 adjacent the side wall 10 and is provided with an exhaust pipe 14 which has an extension 15 located along the longitudinal axis of the tank 11 and which projects above the upper closed end 16 of said tank as shown at 17. This pipe may be extended or connected with an extension for carrying the exhaust gases away from the incubator.

A pipe 20 is connected with the bottom 21 of the tank 15 and has a right angular extension 22 leading to the water jacket of the engine 12. Another extension 23 leads from the lower end of the pipe 20 and is provided with a valve 24 which is normally closed to prevent the loss of water from the cooling system to the engine 12. When it is desired to drain the system, however, the valve 24 is opened and the water will be discharged from the pipe 23.

A pipe 25 which is insulated is connected with the cylinder head 26 of the engine and is in communication with the water jacket so that the heated fluid of the cooling system will be conducted away from the water jacket by the pipe 25 and in the direction indicated by the arrow in Figure 1. This pipe has an extension as shown at 27 which is located within the tank 11 intermediate the ends of the tank while the upper end of the section 27 passes out through a nipple 28 adjacent the upper end of said tank and is adapted to be connected with the radiators within the incubator in a manner which will be presently explained.

An insulated return pipe 30 extends from the return pipe of the radiator and has its lower end as shown at 31 in communication with the lower end of the tank 11 so that the cooling fluid of lower temperature will be returned to the bottom of the tank and through the pipes 20 and 22 of the cooling system to the cooling jacket of the engine 12.

A fuel tank 32 is located at any convenient point and a tubing extends from this tank to the usual carburetor 34 of the engine. While the tank 32 is shown at a higher level than the carburetor 34 this tank may be located below the level of the carburetor where the usual vacuum pump is employed for drawing the fuel from the tank and supplying the engine with the fuel.

The engine drives a shaft 35 to which is secured a pulley 36 and a belt 37 is trained on this pulley and likewise on a pulley 38 which is mounted on a shaft 39 extending inwardly of the side wall 10 of the incubator 40.

A clutch mechanism, generally designated by the numeral 41, is cooperatively associated with the pulley 38 for connecting the pulley to the shaft 39.

A pulley 45 is secured to the shaft 39 and drives a belt 46 trained on a pulley 47 which is loose on a shaft 48. Said shaft is carried at its ends by the opposite side walls of the incubator 40. An air circulating device 49 is connected to the pulley 47. A cylindrical frame 50 having the usual trays 51 for supporting the eggs during the incubation period is loosely mounted on the shaft 48. The members 49a of the air circulating device 49 revolves around the frame 50.

The section 27 of the pipe 25, as has been stated, extends through a nipple 28 at the upper end of the tank 11 and extends along the top 52 of the incubator as shown at 53. Branch pipes 54 connect the pipe 53 with the upper end of radiators 55, 56 and 57. A thermostat 58 is incorporated in each of the branch pipes 54 for a purpose which will be presently explained. The return pipe 53, as shown in Fig. 3, enters the side wall 10 of the incubator and extends along the lower edges of the radiators as shown at 60. Branch pipes 61 connect the section 60 of the return pipe with the various radiators at diagonally opposite points from the points where the inlet pipes 54 are connected with the radiators.

A special construction of each thermostat is shown more particularly in Fig. 4 and includes a valve casing 62 which is located between the sections 54 and 54a of the branch pipes connecting the pipe 53 with the radiators. This valve casing includes a valve seat 63 which is adapted to be engaged by a valve 64 carried by a diaphragm 65 and a stem 66. Two U-shaped members 67 have their lower ends secured to the periphery of an annular flange 68 formed on the upper end of the valve casing 62.

The bridging members of the U-shaped members 67 where they cross, as shown at 69, are secured together and provided with alined passages 70.

A ring 72 is mounted on the upper face of the flexible diaphragm 65 and this ring, diaphragm and flange are all secured together in any approved manner for sealing the chamber 73 against the loss of fluid.

A brace bar 74 secured at diametrically opposite points to the upper face of the ring 72 is provided with a curved member 75. The bar 74 and the member 75 are provided with vertically alined openings for slidably receiving the stem 66 of the valve 64.

A plurality of thermostatic elements 76 are mounted upon a threaded stem 77 in spaced relation within the U-shaped members 67. These thermostatic elements in the form of bellows are maintained in spaced relation by means of collars 78 which are threaded onto the stem 77. A nut 79 is threaded onto the lower end of the stem and engages the under face of the lowermost member 76. Said stem is provided with a reduced portion 80 which projects into the hollow stem 66.

A nut 81 is secured to the upper bridging member 69 and has an internally threaded passage to receive the threaded stem 77. A knurled knob 82 is secured to the outer end of the stem 77 so that when the knob is rotated said stem will be screwed inwardly for moving the nut 79 closer to the upper free end 83 of the hollow stem 66.

The operation of my device is as follows: When the internal combustion engine 12 is started exhaust gases from the engine will pass through the connection 14 and through the pipe 15 and since water is located within the tank 11 this water will not only be heated by the exhaust gases passing through the pipe 15, but the hot water will also be heated when it leaves the cooling system of the engine. At this time, however, the clutch 41 is moved to an inoperative position until the radiators have become sufficiently heated.

The hot water rises through the pipe 25 from the engine. The water in the section 27 of the pipe 25 is further heated by the water in the tank 11. The water from pipe 27 then passes to the inlet pipe 53 and thence to the radiators 55 to 57 inclusive by their respective branch pipes 54. The colder water is returned to the bottom of the tank 11 by the pipe 30 which is in communication with the pipe 60 that has branch connections 61 with the radiators.

The clutch members 41 may be moved to an operative position whereby the pulley 38 being revolved by the belt 37 will cause rotation of the shaft 39 and likewise the pulley 47, whence the air circulating device 49 will be revolved and a circulation of air will be maintained in the compartments in the incubator.

It will be seen by this construction that the internal combustion engine 12 not only supplies hot water to the radiators for maintaining a predetermined temperature in the incubator but the engine also drives the air moving device 49 for maintaining the circulation of air in the incubator.

When the temperature in any of the compartments of the incubator rises above a predetermined degree the thermostatic elements 76 will expand and move the nut 79 against the upper end 83 of the stem 66 and force said stem and the valve 64 downwardly against the pressure of the water in the chamber 73 so that the valve 64 will engage the seat 63 and cut off further circulation of the water through the radiator. It will be particularly noted from this construction that the thermostats control each individual radiator in accordance with the temperature in the neighborhood.

When the temperature falls in the incubator the thermostatic elements 76 will be contracted and move the nut 79 away from the upper free end of the stem 66 whereby the valve 64 will be moved away from the seat 63 and the flow of hot water through the chamber 73 and through the pipes 54 and 54a will be continued until the temperature then again rises to a predetermined degree.

When desired a branch pipe may be connected with the section 14 of the exhaust pipe 15 with a thermostatically controlled valve for cutting off the flow of exhaust gases through the pipe 15 and diverting the gases into the branch pipe until the temperature of the water in the tank 11 falls below a predetermined degree. The thermostat in this case will be controlled by the temperature of the water in the tank 11.

A thermometer 90 is embodied in the pipe 53 to indicate the temperature of water passing from the pipe 27 to the pipe 53.

All of the pipes or tanks through which the water flows are insulated to protect the water from the loss of heat.

If at any time it is desired to drain the water out of the tank 11 and from the radiators and the jacket of the engine 12 the valve 24 is opened for that purpose. However, during the normal operation of the engine the valve 24 is closed and sufficient water is maintained in the hot water heating system for obtaining the proper circulation.

When the screw 77 is rotated in one direction the nut 79 is moved closer to the upper end 81 of the stem 66 in order to make the thermostat less sensitive to temperature drops in the incubator. A reverse rotation of the screw, however, will maintain the circulation of water through the radiator for a longer period of time.

A pump, not shown, may be operated by the engine 12 for maintaining a forced circulation of water through the heating system if desired.

The purpose of the extension 27 is for equalizing the temperatures of the water flowing into the radiators 57. The larger body of water in tank 11 tends to keep a constant temperature without abrupt changes in the inflowing water into the radiators.

I claim:

1. In an incubator, a hot water heating system including radiators located within the incubator, an internal combustion engine having a water jacket, a pipe connecting the water jacket with the radiators, a vertically disposed storage tank for water, a return pipe connecting the radiators with the bottom of the tank, a portion of the first mentioned pipe being located within the tank, said engine having an exhaust pipe extending upwardly through the entire length of the tank for heating the water therein, a pipe connecting the lower end of the tank with the cooling jacket and acting as a return for the water.

2. In an incubator, a hot water heating system including radiators located within the incubator, an internal combustion engine having a water jacket, a pipe connecting the water jacket with the radiators, a vertically disposed storage tank for water, a return pipe connecting the radiators with the bottom of the tank, a portion of the first mentioned pipe being located within the upper portion of the tank, said engine having an exhaust pipe extending through the entire length of the tank for heating the water therein, a pipe connecting the lower end of the tank with the cooling jacket and acting as a return for the water, a discharge pipe connected with the the last mentioned pipe for draining water from the radiators, the tank and the cooling jacket, and a valve for closing the discharge pipe.

RAY M. PETERSIME.